(12) United States Patent
Thumati et al.

(10) Patent No.: US 9,724,979 B1
(45) Date of Patent: Aug. 8, 2017

(54) MODEL-BASED METHOD TO DETECT ABNORMAL OPERATIONS IN HEAT EXCHANGERS

(71) Applicant: THE BOEING COMPANY, Chicago, IL (US)

(72) Inventors: Balaje Thumati, Kirkland, WA (US); Nail Hanov, St. Louis, MO (US); Eric L. Nicks, Defiance, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/140,046

(22) Filed: Apr. 27, 2016

(51) Int. Cl.
| | |
|---|---|
| *B64D 13/08* | (2006.01) |
| *B64D 27/10* | (2006.01) |
| *B60H 1/00* | (2006.01) |
| *G05B 17/02* | (2006.01) |
| *B64D 13/06* | (2006.01) |

(52) U.S. Cl.
CPC ..... *B60H 1/00735* (2013.01); *B60H 1/00321* (2013.01); *B64D 13/06* (2013.01); *B64D 13/08* (2013.01); *B64D 27/10* (2013.01); *G05B 17/02* (2013.01); *B64D 2013/0618* (2013.01)

(58) Field of Classification Search
CPC ............ B60H 1/00735; B60H 1/00321; B64D 13/06; B64D 13/08; B64D 27/10; B64D 2013/0618; G05B 17/02
See application file for complete search history.

(56) References Cited

U.S. PATENT DOCUMENTS

| | | | | | |
|---|---|---|---|---|---|
| 3,711,044 | A | * | 1/1973 | Matulich | B64D 13/06 165/212 |
| 2008/0115503 | A1 | * | 5/2008 | Vasquez | F02C 6/08 60/785 |
| 2013/0180270 | A1 | * | 7/2013 | Lemieux | F25B 9/06 62/86 |
| 2015/0121842 | A1 | * | 5/2015 | Moes | B64D 13/06 60/204 |
| 2015/0143806 | A1 | * | 5/2015 | Friesth | F01K 3/00 60/517 |

(Continued)

*Primary Examiner* — Rodney Butler
(74) *Attorney, Agent, or Firm* — Patterson & Sheridan, LLP

(57) ABSTRACT

A computer-implemented method, environmental control system, and aircraft are provided. Environmental operating conditions data for a heat exchanger is received. Measured values from sensors measuring parameters of the heat exchanger are also received. An operating model for the heat exchanger based on the received environmental operating conditions is retrieved from a first data structure. The retrieved model includes estimated values for the sensors. A difference between the estimated values and the measured values is calculated. The calculated differences are compared to at least one threshold value. Upon the differences exceeding the at least one threshold value, the calculated differences are compared to abnormal operation models in an abnormal operation library data structure. Upon the calculated difference matching an abnormal operation model in the abnormal operation library data structure, outputting an abnormal operation identity associated with the abnormal operation model. If there is no match, a learning process develops a new model for a new abnormal operation.

20 Claims, 4 Drawing Sheets

(56) References Cited

U.S. PATENT DOCUMENTS

| | | | | |
|---|---|---|---|---|
| 2015/0275758 A1* | 10/2015 | Foutch | .................... | F02C 7/047 60/779 |
| 2015/0275769 A1* | 10/2015 | Foutch | ...................... | F02C 9/18 60/776 |
| 2015/0354464 A1* | 12/2015 | Hillel | ........................ | F02C 3/04 415/1 |
| 2016/0153365 A1* | 6/2016 | Fletcher | .................... | F02C 9/50 60/773 |
| 2016/0153684 A1* | 6/2016 | Lemieux | ............. | B60H 1/3204 62/87 |
| 2016/0306725 A1* | 10/2016 | Hare | ................... | G06F 11/2263 |

* cited by examiner

MODEL-BASED METHOD TO DETECT
ABNORMAL OPERATIONS IN HEAT
EXCHANGERS

BACKGROUND

Aspects described herein relate to an environmental control system (ECS) connected to a gas turbine engine, and more specifically, to a method and system for diagnosing and predicting performance below a specified performance level (i.e., below-specified performance) of an ECS. Often, abnormal operation of an ECS is difficult and time consuming to diagnose.

SUMMARY

According to one aspect, a computer-implemented method includes receiving environmental operating conditions data for a heat exchanger. The method also includes receiving measured values from sensors measuring parameters of the heat exchanger. The method also includes retrieving from a first data structure an operating model for the heat exchanger based on the received environmental operating conditions, wherein the retrieved operating model includes estimated values for the sensors. The method also includes calculating differences between the estimated values and the measured values. The method also includes comparing the calculated differences to at least one threshold value. The method also includes, upon the differences exceeding the at least one threshold value: comparing the calculated differences to abnormal operation models in an abnormal operation library data structure, and, upon the calculated difference matching an abnormal operation model in the abnormal operation library data structure, outputting an abnormal operation identity associated with the matched abnormal operation model.

According to one aspect, an environmental control system (ECS) for a vehicle includes a heat exchanger operable to remove heat from an airflow therethrough. The ECS also includes first sensors operable to detect environmental operating conditions of the heat exchanger. The ECS also includes second sensors operable to detect airflow conditions in the heat exchanger. The ECS also includes a controller operable to receive environmental operating conditions data for the heat exchanger from the first sensors. The controller is also operable to receive measured values from sensors measuring parameters of the heat exchanger from the second sensors. The controller is also operable to retrieve from a first data structure an operating model for the heat exchanger based on the received environmental operating conditions, wherein the retrieved operating model includes estimated values for the sensors. The controller is also operable to calculate differences between the estimated values and the measured values. The controller is also operable to compare the calculated differences to at least one threshold value. The controller is also operable to, upon the differences exceeding the at least one threshold value: compare the calculated differences to abnormal operation models in an abnormal operation library data structure, and, upon the calculated differences matching an abnormal operation model in the abnormal operation library data structure, output an abnormal operation identity associated with the matched abnormal operation model.

According to one aspect, an aircraft includes an aircraft cabin adapted to be pressurized. The aircraft also includes a gas turbine engine, wherein the gas turbine engine includes at least one engine bleed. The aircraft also includes an environmental control system (ECS) operable to receive bleed air from the at least one engine bleed and to provide conditioned air to the aircraft cabin. The ECS includes a heat exchanger operable to remove heat from an airflow therethrough. The ECS also includes first sensors operable to detect environmental operating conditions of the heat exchanger. The ECS also includes second sensors operable to detect airflow conditions in the heat exchanger. The ECS also includes a controller operable to receive environmental operating conditions data for the heat exchanger from the first sensors. The controller is also operable to receive measured values from sensors measuring parameters of the heat exchanger from the second sensors. The controller is also operable to retrieve from a first data structure an operating model for the heat exchanger based on the received environmental operating conditions, wherein the retrieved operating model includes estimated values for the sensors. The controller is also operable to calculate differences between the estimated values and the measured values. The controller is also operable to compare the calculated differences to at least one threshold value. The controller is also operable to, upon the differences exceeding the at least one threshold value: compare the calculated differences to abnormal operation models in an abnormal operation library data structure, and, upon the calculated differences matching an abnormal operation model in the abnormal operation library data structure, output an abnormal operation identity associated with the matched abnormal operation model.

BRIEF DESCRIPTION OF THE SEVERAL
VIEWS OF THE DRAWINGS

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In aspects described herein, various environmental parameters and operating parameters are monitored and compared to modeled operating parameters, based on the environmental parameters. If the monitored parameters differ sufficiently from the modeled parameters, then the ECS is determined to be operating abnormally. A characteristic of the differences between the monitored and modeled parameters can be compared to characteristics associated with known abnormal operation modes of the ECS to identify a cause for the abnormal operation. In the event the characteristic of the differences does not match a characteristic of a known abnormal operation mode, then the characteristic can be stored to generate a new abnormal operation mode for future reference.

Aircraft and other vehicles typically include an environmental control system (ECS) that provides a passenger compartment and/or other compartments (e.g., an electronics compartment or a cargo compartment) with temperature adjusted and/or de-humidified air. For pressurized aircraft, the ECS also provides pressurization to at least the passenger compartment. The pressurized air is provided by an engine bleed, wherein high-pressure air is removed from a compressor of the gas turbine engine. The air from the gas turbine engine is typically too hot to be provided directly to a passenger cabin. For example, the air from the engine bleed could be in excess of 300° F. Thus, a portion of the engine bleed air is diverted to a cooling system that cools the diverted air and dehumidifies the air using a water separator. The diverted cold air is then mixed with the remaining hot engine bleed air to provide air to the passenger cabin that is set at a suitable (e.g., comfortable) level. By adjusting a ratio of the diverted cold air to the remaining hot engine bleed air, the temperature of the air being provided to the cabin can be controlled and adjusted.

Figure 1:
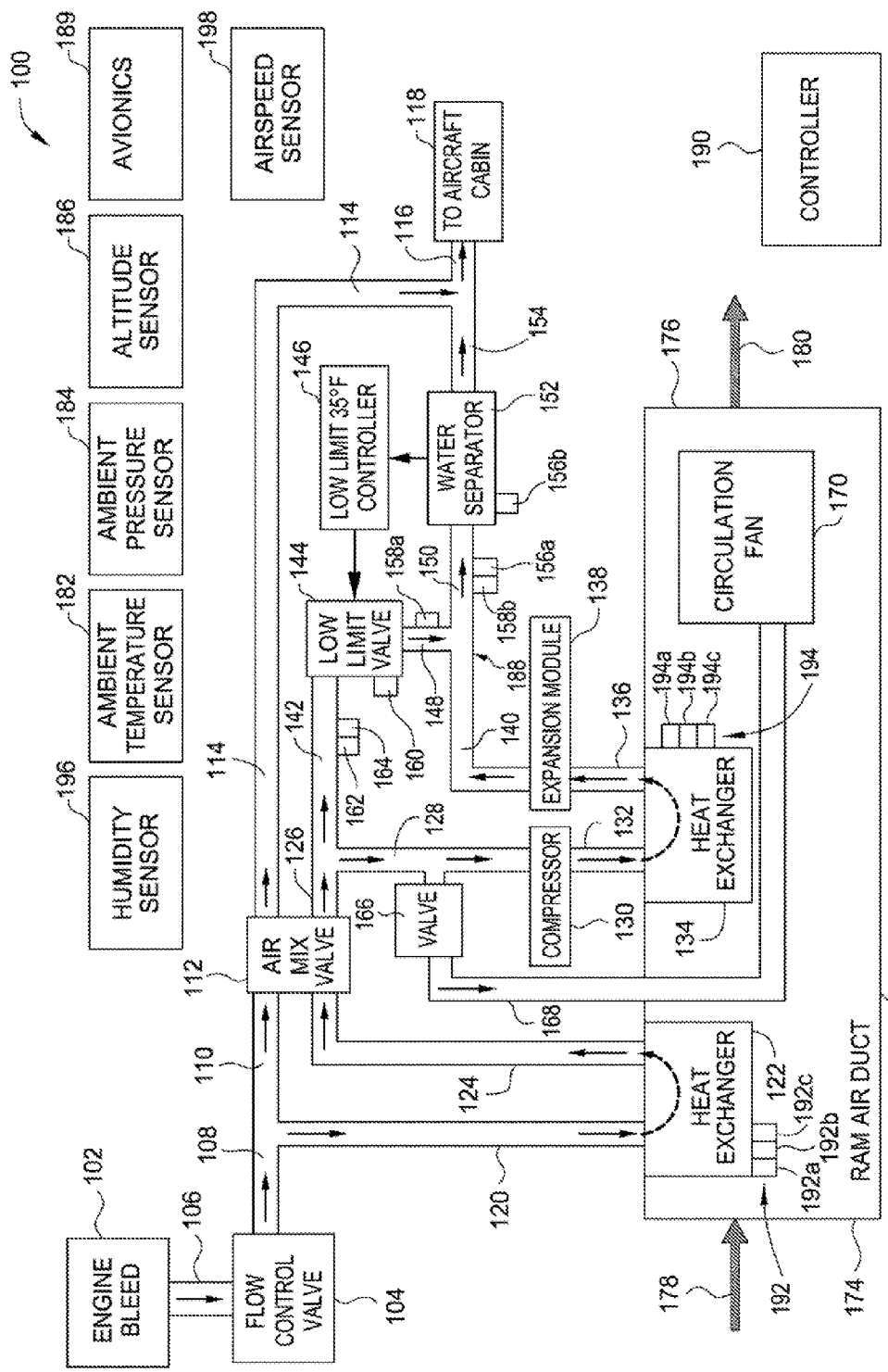
FIG. 1 is a schematic block diagram of an environmental control system (ECS) in an aircraft.

FIG. 1 is a block diagram of an environmental control system (ECS) 100 for an aircraft. The block diagram shows various components with air flow paths therebetween. In various aspects, the air flow paths are ducts that direct air from one component to another. In various other aspects, two components may be contained within a single module and the air flow path is an internal channel within the module. In the following discussion, the air flow paths are described as ducts, but refer to any type of passageway, channel, or other flow path that can direct the flow of air. The block diagram includes arrows in the depicted ducts to illustrate the direction of airflow.

The ECS 100 shown in FIG. 1 is arranged between an engine bleed 102 and an aircraft cabin 118. The engine bleed 102 can be an engine bleed on a gas turbine engine, an auxiliary power unit (APU), or an output of a turbocharger for a reciprocating engine, for example. Air from the engine bleed 102 flows through a duct 106 to a flow control valve 104. The flow control valve 104 is operable to adjust the flow rate of air that from the engine via the engine bleed 102. Air passing through the flow control valve 104 is output to a duct 108. The air from the engine bleed 102 and output from the duct 108 is hot. For example, the air output from the duct 108 could be 300° F. or hotter. As discussed above, the ECS 100 diverts a portion of the air from the duct 108 directly to the aircraft cabin 118 (via duct 110, an air mix valve 112, and ducts 114 and 116 leading to the aircraft cabin 118). Also, the ECS 100 diverts a remaining portion of the air from the duct 108 through a cooling system (beginning with duct 120), discussed in greater detail below, to reduce the temperature of the remaining portion of the air. The reduced temperature air is output from a duct 154 to mix with the hot air from the duct 114. The mixed cold air and hot air is provided to the aircraft cabin 118 via the duct 116. The air mix valve 112 adjusts the ratio of hot air (via duct 114) and cold air (via duct 154) to control the temperature of the air being provided to the aircraft cabin 118.

The ECS 100 includes a two-stage cooling arrangement. In the first stage, hot air output from the duct 108 travels into a duct 120. The duct 120 directs the air to a heat exchanger 122 in a ram air duct 172 of the aircraft. Typically, the ram air duct 172 is arranged on the bottom of the aircraft (e.g., in a wing-fuselage fairing) and includes an inlet 174 and the outlet 176. Air from the atmosphere flows into the ram air duct 172 through the inlet 174 (as indicated by arrow 178) and flows out of the ram air duct 172 via the outlet 176 (as indicated by arrow 180). Movement of the aircraft through the air (e.g., during flight and/or during high-speed taxi operations) may provide sufficient airflow through the ram air duct 172 for the first heat exchanger 122 (and the second heat exchanger 134, discussed below) to operate effectively. At other times (e.g., when the aircraft is parked and/or taxiing slowly), a circulation fan 170 (discussed in greater detail below) is operated to drive airflow through the ram air duct 172. The air entering the heat exchanger 122 from the duct 120 is output to a duct 124. The heat exchanger 122 removes some of the heat from the air traveling through the heat exchanger 122 from the duct 120. The temperature of the air in the duct 124 depends on several factors, such as the outside air temperature, but may be between 40° F. and 200° F. The warm air from the duct 124 is referred to herein as a warm air source.

The air from the duct 124 (i.e., the warm air source) is directed to the air mix valve 112. The air mix valve 112 is a proportional valve, meaning that the air mix valve 112 operates between an end of a range where 100% of the hot air from the duct 110 passes to the duct 114 and 0% of the warm air from the duct 124 passes to a duct 126 and an opposite end of the range where 0% of the hot air from the duct 110 passes to the duct 114 and 100% of the warm air from the duct 124 passes to the duct 126. For example, in the middle of the range of the air mix valve 112, 50% of the hot air from the duct 110 passes to the duct 114 and 50% of the warm air from the duct 124 passes to the duct 126. As another example, at one position of the air mix valve 112, 25% of the hot air from the duct 110 passes to the duct 114 and 75% of the warm air from the duct 124 passes to the duct 126. As another example, at one position of the air mix valve 112, 75% of the hot air from the duct 110 passes to the duct 114 and 25% of the warm air from the duct 124 passes to the duct 126. In at least one aspect, the air mix valve 112 typically operates in positions between the middle of the range and the end of the range in which 100% of the warm air from the duct 124 passes to the duct 126.

After the warm air passes to the duct 126, a portion of the warm air from the duct 126 is directed to a duct 128 for the second cycle of the two-cycle cooling system. The warm air in the duct 128 is directed to a compressor 130, which raises the pressure and temperature of the air. The air from the compressor 130 passes through a duct 132 to the second heat exchanger 134 in the ram air duct 172. The second heat exchanger 134 decreases the temperature of the air from the duct 132. The cooled air from the second heat exchanger 134 then travels through a duct 136 to an air cycle machine 138. The air cycle machine 138 can be a turbine or other expander that reduces the pressure and temperature of the air. At the output of the air cycle machine 138, the air flowing into a duct 140 can be close to the freezing point of water. For example, the air flowing through the duct 140 could be in a range between 30° F. and 35° F. depending on the outside air temperature and the airflow through the ram air duct 172. The output from the air cycle machine 138 is referred to herein as a cold air source.

The duct 140 from the air cycle machine 138 directs the cold air to a junction 188. Air traveling from the duct 140 passes through the junction 188 to a duct 150 that leads to a water separator 152. The water separator 152 removes water from the air in the duct 150. In various aspects, the water separator 152 may circulate the air flowing therethrough. Water droplets, which are heavier than the air, are moved outwardly by the circular motion and thereby separated from the air. The cold air with moisture removed is output by the water separator 152 to the duct 154. The cold air from the duct 154 mixes with the hot air from the duct 114 to provide air at a suitable temperature for the aircraft cabin 118. Air reaches the aircraft cabin 118 via the duct 116 at a suitable temperature to provide controllable temperature regulation in the cabin.

Returning to the water separator 152, if the cold air from the air cycle machine 138 is too cold, the water droplets in the water separator 152 could freeze and form ice in the water separator 152. Such icing of the water separator 152 could render the water separator 152 inoperative and/or could block the flow of the cold air to the duct 154 that supplies the cold air to the aircraft cabin 118. The ECS includes a warm air path that supplies warm air to increase the temperature of the cold air from the air cycle machine 138 in the event that the cold air is too cold. Referring again to the duct 126 from the air mix valve 112, some of the warm air output by the air mix valve 112 is diverted to a duct 142 that leads to a low temperature limit valve 144. The low temperature limit valve 144 is operated by a low limit controller 146 that opens or closes the valve to control the temperature of the air in or reaching the water separator 152. In the ECS 100 shown in FIG. 1, the low limit controller 146 operates the valve to control the temperature of the air in or reaching the water separator 152 at or above a threshold temperature (e.g., a temperature of 35° F.). In various other aspects, the low limit controller 146 could control the temperature at or above a different temperature, such as above 32° F., for example. The ECS 100 includes a temperature sensor 156a that detects an air temperature (i.e., airflow conditions) in the duct 150 supplying cold air to the water separator 152 and/or a temperature sensor 156b that detects an air temperature (i.e., airflow conditions) in the water separator 152. The temperature sensors 156a and/or 156b are in communication with the low limit controller 146 and provide temperatures that the low limit controller 146 uses to control operation of the low temperature limit valve 144. For example, the low limit controller 146 may operate in a closed feedback loop based on the temperature detected by the temperature sensors 156a and/or 156b. In the event the temperature of the cold air from the air cycle machine 138 is below the threshold temperature (e.g., a threshold temperature of 35° F.), then the low limit controller 146 could at least partially open the low temperature limit valve 144 to add warm air from the duct 142 to the cold air from the duct 140 at the junction 188. The added warm air can increase the temperature of the air in the duct 150 such that water condensed out in the water separator 152 does not freeze.

As discussed above, the ram air duct 172 can include a circulation fan 170 that can force air through the ram air duct 172 in the event that movement of the aircraft through the atmosphere does not provide sufficient flow (e.g., when the aircraft is stationary on the ground). The circulation fan 170 can be driven by warm air from the duct 126 and the air mix valve 112. For example, in the ECS 100, a valve 166 that controls flow of warm air to the circulation fan 170 is in communication with the duct 128. When the valve 166 is open, warm air flows through a duct 168 to the circulation fan 170, thereby driving the circulation fan 170.

In addition to the temperature sensors 156a and 156b discussed above, various aspects of the ECS 100 include other sensors that measure operating parameters of the ECS 100. For example, the ECS 100 can also include a pressure sensor 158a that detects air pressure (i.e., airflow conditions) in the duct 148 leading from the low temperature limit valve 144 and/or a pressure sensor 158b that detects air pressure (i.e., airflow conditions) in the duct 150 leading to the water separator 152. The ECS 100 can also include a valve position sensor 160 that reports a position of the low temperature limit valve 144. The ECS 100 can also include a temperature sensor 162 that detects air temperature conditions (i.e., airflow conditions) in the duct 142 leading to the low temperature limit valve 144 and a temperature sensor 164 that detects air temperature (i.e., airflow conditions) in the duct 142 leading to the low temperature limit valve 144.

The ECS 100 could also include or be in communication with various sensors that detect various ambient conditions. For example, the ECS 100 could receive an ambient temperature (e.g., an outside air temperature) from an ambient temperature sensor 182 associated with avionics 189 for the aircraft and an ambient pressure from an ambient pressure sensor 184. The ECS 100 could also receive altitude information from an altitude sensor 186 (e.g., an altimeter) associated with the avionics 189 for the aircraft and airspeed information from an airspeed sensor 198 (e.g., a pitot-static tube) associated with the avionics 189 for the aircraft. The ECS could also receive humidity information from a humidity sensor 196.

The heat exchangers 122 and 134 can also include respective sensors 192 and 194 that measure various operating parameters of the heat exchangers 122 and 134. For example, in one aspect, the sensors 192 include at least one of a temperature sensor 192a, an air flow sensor 192b, and a humidity sensor 192c arranged at an outlet of the heat exchanger 122 (e.g., in the duct 124). Similarly, the sensors 194 include at least one of a temperature sensor 194a, an air flow sensor 194b, and a humidity sensor 194c arranged at an outlet of the heat exchanger 134 (e.g., in the duct 136). In various aspects, the sensors 192 could also include differential pressure and/or temperature sensors measuring a pressure change and/or a temperature change across the heat exchanger 122. Similarly, the sensors 194 could also include differential pressure and/or temperature sensors measuring a pressure change and/or a temperature change across the heat exchanger 134. The sensors 192 and 194 could measure other parameters.

The ECS 100 is controlled by a controller 190. In at least one aspect, the controller 190 includes a computer processor, computer memory, inputs to receive data from the various sensors, and outputs for controlling the valves in the ECS 100.

Figure 2:
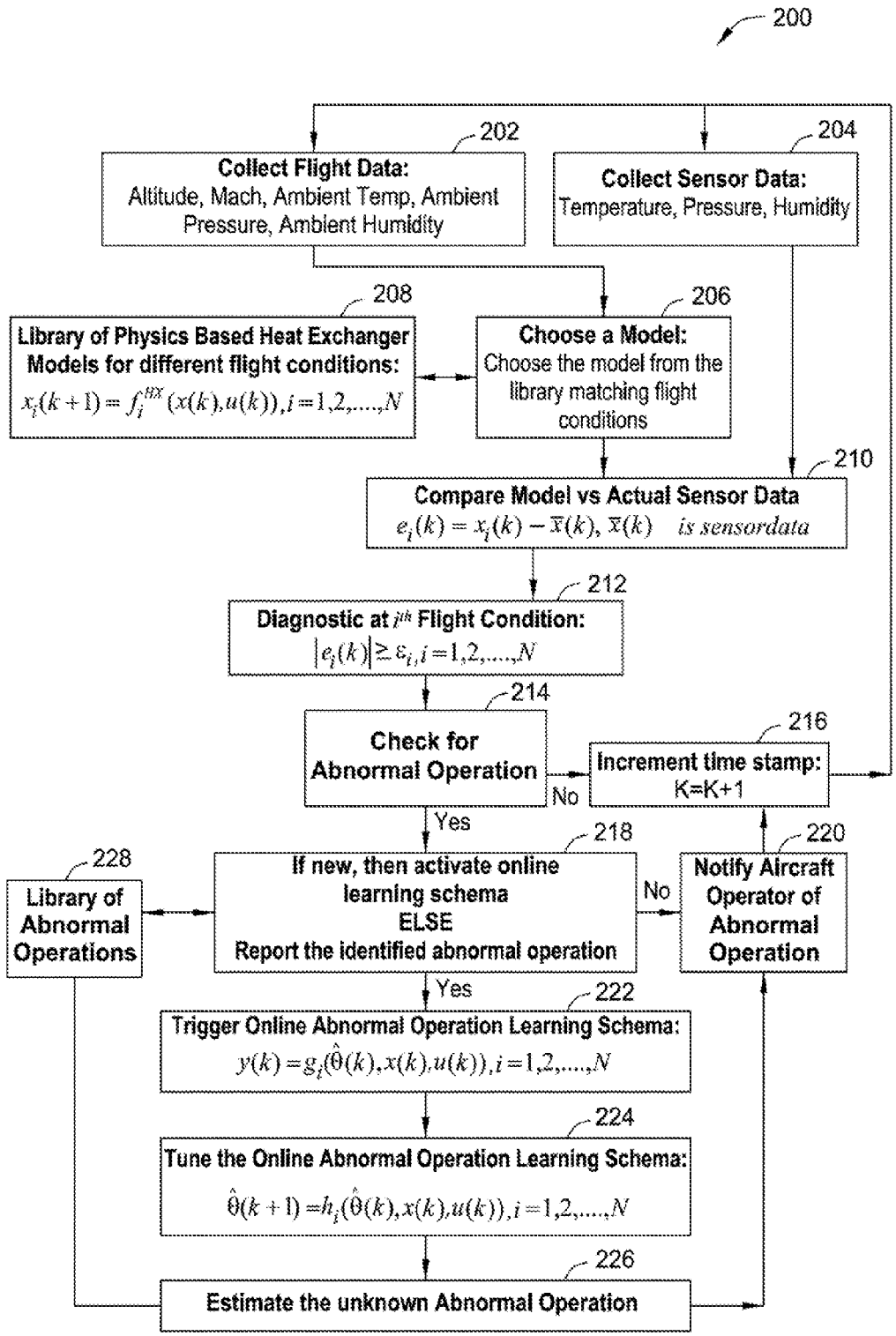
FIG. 2 is a flow chart for a method for detecting abnormal operation of the ECS of FIG. 1.

FIG. 2 is a flow chart of a method 200 according to one aspect for identifying abnormal operation of an ECS (e.g., the ECS 100 illustrated in FIG. 1) in an aircraft. In the following discussion, the method 200 is described with reference to the heat exchanger 122, but the method 200 could be similarly applied with reference to the heat exchanger 134. In block 202, flight condition data is collected. For example, in one aspect, altitude data is collected from the altitude sensor 186, ambient temperature data is collected from the ambient temperature sensor 182, ambient pressure data is collected from the ambient pressure sensor 184, Mach number is calculated based on airspeed data from the airspeed sensor 198, and ambient humidity data is collected from the humidity sensor 196. In block 206, an operating model for the heat exchanger is selected from a data structure 208 of operating models, based on the flight condition data collected in block 202. The data structure 208 of operating models could be stored in computer memory in the controller 190, for example. In one aspect, the operating models stored in the data structure take the form of Equation (1a):

$$x_i(k+1) = f_i^{HX}(x(k), u(k)) \text{ for } i=1, 2, \ldots N; \tag{1a}$$

where "i" is an index of flight conditions, "N" is the Nth flight condition, k is a time stamp, "x(k)" is an array of estimated heat exchanger sensor data, and "u(k)" is an array of ambient condition sensor data. Stated differently, the operating models according to Equation (1a) predict heat exchanger sensor data from the sensors 192 for a next time step based on the estimated sensor data and ambient conditions at a current time step. The operating models can be generated from test data and/or operations data, for example. For purposes of clarity below, Equation (1a) can be rewritten to solve for time step k, according to Equation (1b):

$$x_i(k) = f_i^{HX}(x(k-1), u(k-1)). \tag{1b}$$

In one aspect, the array of estimated heat exchanger sensor data x(k) from the operating model takes the form of Equation (2):

$$x(k) = \begin{bmatrix} Est.\_HX\_Temp(k) \\ Est.\_HX\_Flow(k) \\ Est.\_HX\_Humidity(k) \end{bmatrix}; \tag{2}$$

wherein "Est.\_HX\_Temp(k)" is an estimated temperature of air output by the heat exchanger (HX) at time step k, "Est.\_HX\_Flow(k)" is an estimated airflow from the heat exchanger at time step k, and "Est.\_HX\_Humidity(k)" is an estimated humidity of the air output by the heat exchanger at time step k. In one aspect, the array of ambient condition sensor data u(k) takes the form of Equation (3):

$$u(k) = \begin{bmatrix} \text{Altitude}(k) \\ \text{Mach}(k) \\ \text{Temperature}(k) \\ \text{Pressure}(k) \\ \text{Humidity}(k) \end{bmatrix}; \tag{3}$$

wherein "Altitude(k)" is a measured altitude of the aircraft at time step k, "Mach(k)" is the measured Mach number of the aircraft at time step k, "Temperature(k)" is the measured ambient atmospheric temperature around the aircraft at time step k, "Pressure(k)" is the measured ambient atmospheric temperature around the aircraft at time step k, and "Humidity(k)" is the measured ambient humidity of the atmosphere around the aircraft at time step k.

In block 204, heat exchanger sensor data is collected (e.g., from the sensors 192) and an array of measured heat exchanger data $\bar{x}(k)$ is generated. In one aspect, the array of measured heat exchanger data $\bar{x}(k)$ takes the form of Equation (4):

$$\bar{x}(k) = \begin{bmatrix} Meas.\_HX\_Temp(k) \\ Meas.\_HX\_Flow(k) \\ Meas.\_HX\_Humidity(k) \end{bmatrix}; \tag{4}$$

wherein "Meas.\_HX\_Temp(k)" is a measured temperature of air output by the heat exchanger at time step k, "Meas.\_HX\_Flow(k)" is a measured airflow from the heat exchanger at time step k, and "Meas.\_HX\_Humidity(k)" is a measured humidity of the air output by the heat exchanger at time step k.

In block 210 of the method 200, a difference or residual $e_i(k)$ array is calculated by subtracting the values from the array of measured heat exchanger data from the values from the array of modeled heat exchanger data according to Equation (5a):

$$e_i(k) = \tag{5a}$$

$$x_i(k) - \bar{x}(k) = \begin{bmatrix} Est.\_HX\_Temp(k) - Meas.\_HX\_temp(k) \\ Est.\_HX\_Flow(k) - Meas.\_HX\_Flow(k) \\ Est.\_HX\_Humidity(k) - Meas.\_HX\_Humidity(k) \end{bmatrix},$$

which can be solved to result in Equation (5b):

$$e_i(k) = \begin{bmatrix} Res.\_HX\_Temp(k) \\ Res.\_HX\_Flow(k) \\ Res.\_HX\_Humidity(k) \end{bmatrix}; \tag{5b}$$

wherein "Res.\_HX\_Temp(k)" is a calculated residual or difference for the air temperature output by the heat exchanger at time step k, "Res.\_HX\_Flow(k)" is a calculated residual or difference for airflow from the heat exchanger at time step k, and "Res.\_HX\_Humidity(k)" is a calculated residual or difference for humidity of the air output by the heat exchanger at time step k.

In block 212, the residual array $e_i(k)$ is compared to a difference threshold $\epsilon$. In certain aspects, a value of the difference threshold $\epsilon$ is different for the different operating models, and the particular difference threshold used depends on the operating model selected in block 206. In various other aspects, a value of the difference threshold $\epsilon$ could be the same for all of the operating models. Also, in at least one aspect, the difference threshold $\epsilon$ could be defined as an array of difference thresholds for the different elements of the residual array, which could take the form of Equation (6):

$$\varepsilon_i = \begin{bmatrix} \varepsilon_i\_HX\_Temp \\ \varepsilon_i\_HX\_Flow \\ \varepsilon_i\_HX\_Humidity \end{bmatrix}; \tag{6}$$

wherein "$\epsilon_i\_HX\_Temp$" is an difference threshold for a difference or residual between the modeled and measured air temperatures output by the heat exchanger, "$\epsilon_i\_HX\_Flow$" is an difference threshold for a difference or residual between the modeled and measured airflows from the heat exchanger, and "$\epsilon_i\_HX\_Humidity$" is an difference threshold for a difference or residual between the modeled and measured humidities from the heat exchanger. In such aspects, the values of the elements of the residual array $e_i(k)$ are compared to values of the respective elements of the difference threshold array $\epsilon_i$ to identify any residual values that exceed the respective threshold values. In block 214, in the event any of the values of the elements in the residual array $e_i(k)$ are larger than the respective values in the difference threshold array $\epsilon_i$, an alert can be generated. In various aspects, the values of the elements of the residual array $e_i(k)$ are converted to absolute values before comparing the values therein to values of the respective elements of the difference threshold array $\epsilon_i$ to identify any residual values that exceed the respective threshold values.

Returning to block 212, in various aspects, the difference threshold $\epsilon_i$ could be a scalar that is compared to a normal value $|e_i(k)|$ of the residual array $e_i(k)$. For example, with reference to Equation (5b), above, the normal value $|e_i(k)|$ of the residual array $e_i(k)$ is calculated according to Equation (7):

$$|e_i(k)| = \sqrt{Res.\_HX\_Temp(k)^2 + Res.\_HX\_Flow(k)^2 + Res.\_HX\_Humidity(k)^2}. \tag{7}$$

In block 214, in the event the value of the normal value $|e_i(k)|$ is greater than or equal to the scalar value of the difference threshold $\epsilon_i$, an alert can be generated.

If no alert is generated in block 214, then the method 216 proceeds to block 216 in which the time step is incremented to k=k+1. After the time step is incremented in block 216, blocks 202, 204, 206 (using the data structure 208), 210, 212, and 214 are repeated. If an alert is generated in block 214, then the method proceeds to block 218 to compare the residual array $e_i(k)$ to abnormal operation event characteristics in an abnormal operation event library 228 to identify an abnormal operation type F(k). A abnormal operation characteristic may be defined by Equation (8):

$$f_j = \begin{bmatrix} AB.\_OP.\_HX\_Temp(j) \\ AB.\_OP.\_HX\_Flow(j) \\ AB.\_OP.\_Humidity(j) \end{bmatrix} \text{ for } j = 1, 2, \ldots N; \tag{8}$$

where "j" is an index of abnormal operation characteristics, "N" is the Nth abnormal operation characteristic, "AB._OP._HX_Temp(j)" is a calculated residual or difference for the air temperature output by the heat exchanger associated with the jth abnormal operation characteristic, "AB._OP._HX_Flow(j)" is a calculated residual or difference for airflow from the heat exchanger associated with the jth abnormal operation characteristic, and "AB._OP._HX_Humidity(j)" is a calculated residual or difference for humidity of the air output by the heat exchanger associated with the jth abnormal operation characteristic.

An abnormal operation type F(k) may be determined by comparing the calculated residual array $e_i(k)$ against the abnormal operation characteristics $f_j$ in the abnormal operation event library 228. A abnormal operation type is determined if the calculated residual array $e_i(k)$ closely matches one of the abnormal operation characteristics, as described in Equation (9):

$$F(k) = \begin{cases} f_j & \text{if } e(k) \cong f_j \\ 0 & \text{if } e(k) \neq f_j \end{cases}. \tag{9}$$

The calculated residual array $e_i(k)$ may closely match one of the abnormal operation characteristics if the values in the residual array $e_i(k)$ are within a particular percentage of the respective values in the abnormal operation characteristic (e.g., within 5% or within 10%).

The abnormal operation event library 228 further includes an abnormal operation identity data structure that associates abnormal operation identities, where identified, with respective abnormal operation characteristics. For example, a first particular abnormal operation characteristic may be associated with an abnormal operation identity of "heat exchanger surface fouling." In the event the first particular abnormal operation characteristic closely matches a calculated residual array $e_i(k)$ generated by an ECS 100 on an aircraft, then the "heat exchanger surface fouling" abnormal operation identity could be output by the abnormal operation event library 228 as a determined abnormal operation identity. Another particular abnormal operation characteristic may be associated with an abnormal operation identity of "heat exchanger perforation." In the event the second particular abnormal operation characteristic closely matches a calculated residual array $e_i(k)$ generated by the ECS 100 on the aircraft, then the "heat exchanger perforation" abnormal operation identity could be output by the abnormal operation event library 228 as a determined abnormal operation identity.

In the event the calculated residual array $e_i(k)$ does not closely match any of the abnormal operation characteristics in the abnormal operation event library 228, then the method continues to block 222 to determine the abnormal operation characteristic or abnormal operation model. In one aspect, the calculated residual array $e_i(k)$ could be identified as the abnormal operation characteristic or abnormal operation model. For example, in certain circumstances, the calculated residual array $e_i(k)$ could be calculated based on sensor data measured from a single time step. In such circumstances, the calculated residual array $e_i(k)$ provides values that reconcile the differences between the values predicted by the model and the measured values.

Figure 3:
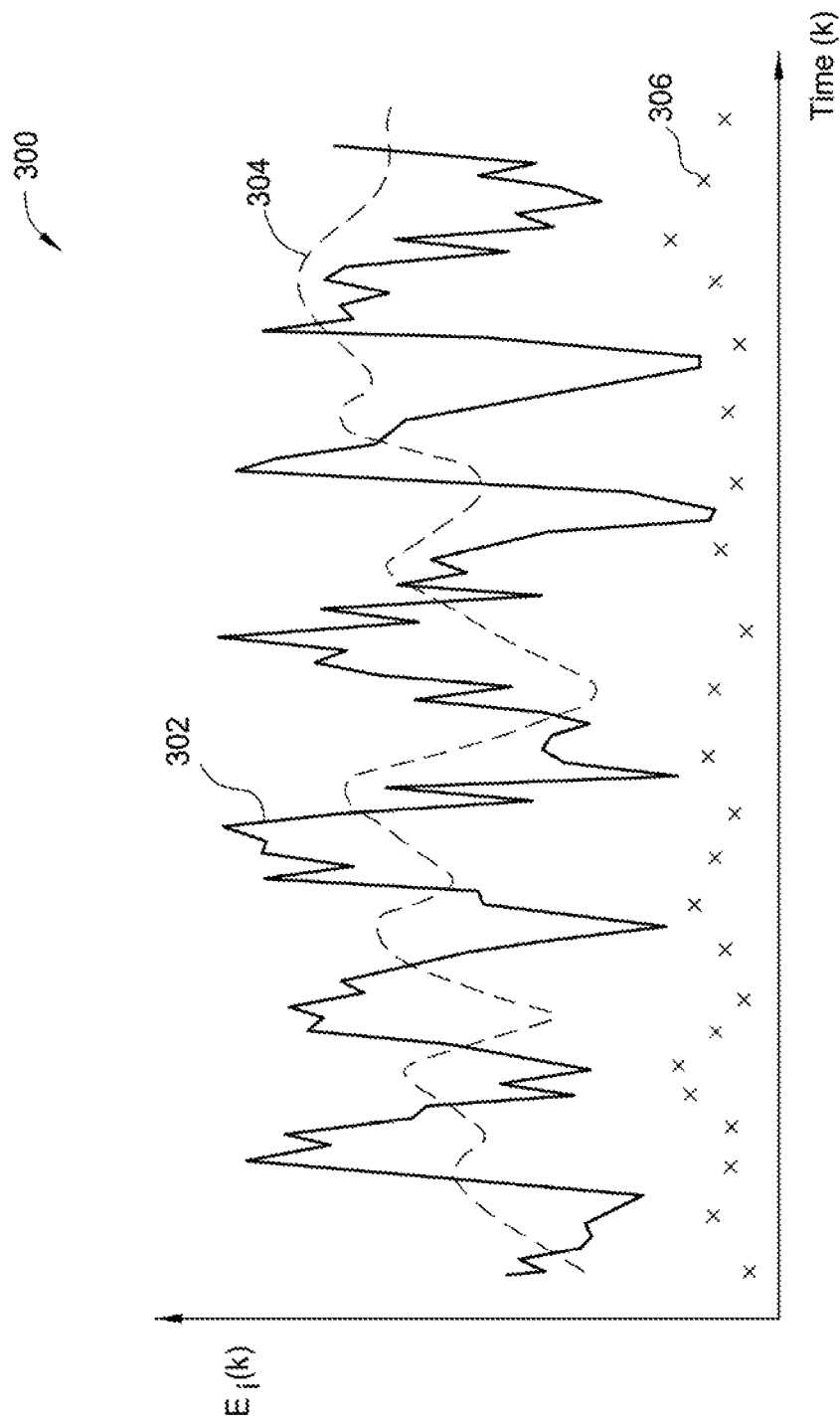
FIG. 3 is a chart illustrating exemplary differences between estimated values and measured values for three parameters over time of the ECS of FIG. 1.

In various other aspects, the abnormal operation characteristic or abnormal operation model is learned based on the calculated residual array $e_i(k)$. For example, with reference to FIG. 3, the values in the calculated residual array $e_i(k)$ could vary over a series of time steps. The values of $e_i(k)$ could vary due to sensor measurement fluctuations or air flow variations through the ECS 100, for example. In such instances, the values of the calculated residual array $e_i(k)$ at any particular time step may not be representative of predominant values (e.g., average values) over the series of time steps. In such aspects, the variations of the value of the residual array $e_i(k)$ over the series of time steps can be statistically analyzed to identify values of the residual array $e_i(k)$ for the purposes of identifying an abnormal operation. FIG. 3 illustrates a chart 300 in which values 302, 304, and 306 of the calculated residual array $e_i(k)$ vary over a series of time steps k. For example, the solid line 302 could represent values of Res._HX_Temp(k) over time, the broken line 304 could represent values of Res._HX_Flow(k) over time, and the line of "x" shapes could represent values of Res._HX_Humidity(k). In such aspects, a learned abnormal operation characteristic y(k) could be learned based on Equation (10):

$$e(k) \approx y(k) = \hat{\theta}^T(k)g(x(k),u(k)). \tag{10}$$

The solution for Equation (10), discussed below, is specific to the model "i" selected above with reference to block 206 of the method 200. Put differently, the learned abnormal operation characteristic y(k) being learned is specific to the particular model "i" that was modeled. In one aspect, $\hat{\theta}(k)$ is an array of weights of a neural network and g(x(k),u(k)) is the basis function, such as a sigmoidal. In another aspect, curve fitting is used to determine coefficients for a quadratic equation wherein $\hat{\theta}(k)$ is provided by Equation (11):

$$\hat{\theta}(k) = \begin{bmatrix} a_0(k) \\ a_1(k) \\ a_2(k) \end{bmatrix}; \quad (11)$$

$g(x(k),u(k))$ is provided by Equation (12):

$$g(x(k), u(k)) = \begin{bmatrix} 1 \\ x(k) \\ x^2(k) \end{bmatrix}; \quad (12)$$

and the quadratic equation is based on Equation (13):

$$\hat{\theta}^T(k)g(x(k), u(k)) = \quad (13)$$
$$\begin{bmatrix} a_0(k) \\ a_1(k) \\ a_2(k) \end{bmatrix}^T \begin{bmatrix} 1 \\ x(k) \\ x^2(k) \end{bmatrix} = [a_0(k) \ a_1(k) \ a_2(k)] \begin{bmatrix} 1 \\ x(k) \\ x^2(k) \end{bmatrix} =$$
$$a_0(k) + a_1(k)x(k) + a_2(k)x^2(k).$$

Equations (11)-(13) are implemented for every parameter in the residual array e(k). For example, with reference to the exemplary residual array e(k) of Equation (5b), a first set of equations (11)-(13) would be provided and solved for the Res._HX_Temp(k) parameter, a second set of equations (11)-(13) would be provided and solved for the Res._HX_Flow(k) parameter, and a third set of equations (11)-(13) would be provided and solved for the Res._HX_Humidity (k) parameter. In such an aspect, the abnormal operation characteristic for each parameter of the residual array e(k) is learned by determining the magnitude of the coefficients $a_0(k)$, $a_1(k)$, and $a_2(k)$ at every time step when the calculated residual array $e_i(k)$ is determined over a period of time (e.g., the values 302, 304, and 306 of the calculated residual array $e_i(k)$ over time in the chart 300).

In block 224 of the method 200, the coefficients $a_0(k)$, $a_1(k)$, and $a_2(k)$ are tuned in accordance with Equation (14):

$$\hat{\theta}(k+1) = h(\hat{\theta}(k), x(k), u(k)). \quad (14)$$

The solution for Equation (14), discussed below, is specific to the model "i" selected above with reference to block 206 of the method 200. Put differently, the tuned abnormal operation characteristic h being learned is specific to the particular model "i" that was modeled. The coefficients are tuned in block 224 through a recursive calculation. At time step k=0, the coefficients $a_0(0)$, $a_1(0)$, and $a_2(0)$ are set to initial values, which may be random or bounded by particular initial conditions. The coefficients at the next time step (i.e., $a_0(k+1)$, $a_1(k+1)$, and $a_2(k+1)$) are then calculated based on Equation (14) and based on the initial values of the coefficients (i.e., $a_0(0)$, $a_1(0)$, and $a_2(0)$). Then, the coefficients at the next time step (i.e., $a_0(k+2)$, $a_1(k+2)$, and $a_2(k+2)$) are then calculated based on Equation (14) and based on the values of the coefficients at the previous time step (i.e., $a_0(k+1)$, $a_1(k+1)$, and $a_2(k+1)$). The above-described recursive process is continued until the coefficients at two sequential time steps are substantially equal. The resulting values for the coefficients provide a good approximation of the abnormal operation model and can be provided as an estimate of the unknown abnormal operation in block 226.

The above-described processes for modeling the abnormal operation model are merely examples. Other machine learning algorithms and/or curve fitting techniques could be used in addition to or in the alternative to the above-described techniques. For example, a least square curve fitting technique could be used in certain aspects. As another example, a spline function could be fit to the parameters of the residual array e(k). As yet another example, a support vector machine could be fit to the parameters of the residual array e(k).

In block 220, the unknown abnormal operation model is reported to the aircraft operator and can also be provided to the abnormal operation event library 228 for a new entry for the abnormal operation library. At a later time, after a cause of the abnormal operation has been determined, the new entry in the abnormal operation event library 228 that includes the unknown abnormal operation model can be updated to include the cause of the abnormal operation (i.e., such that the previously unknown abnormal operation model becomes a known abnormal operation model).

Figure 4:
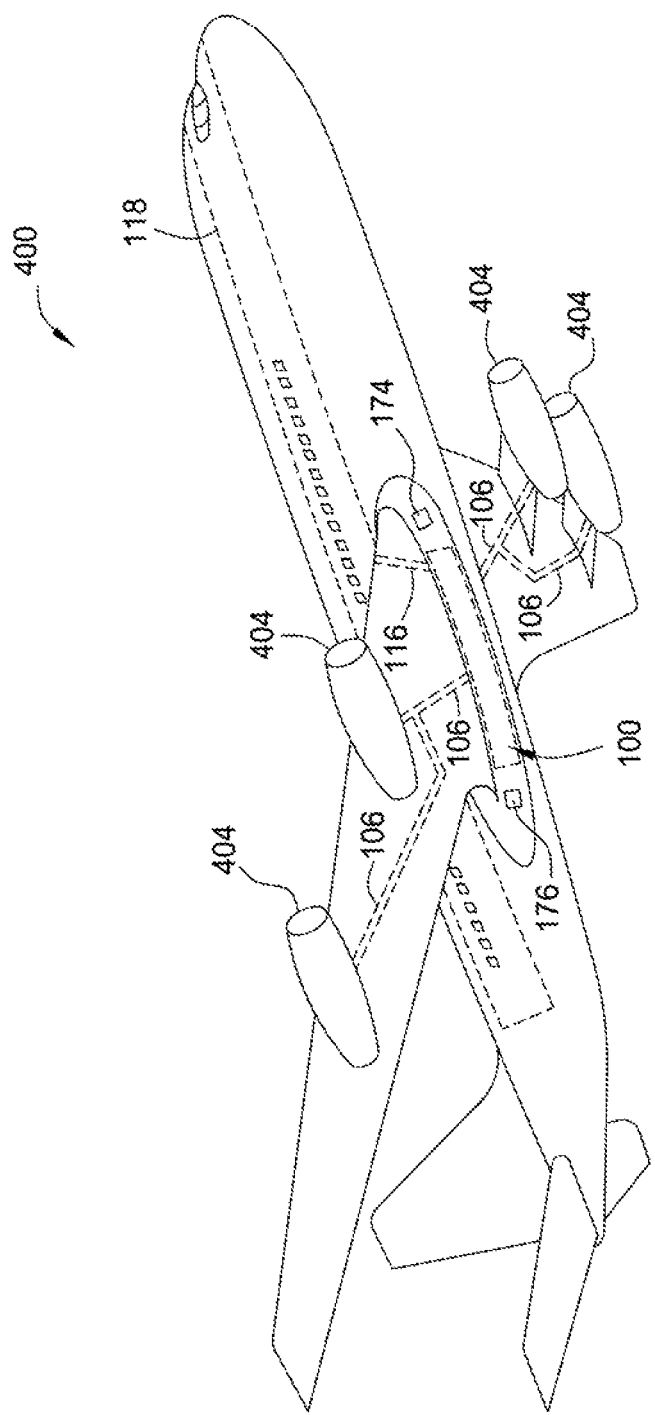
FIG. 4 is a bottom perspective view of an aircraft, wherein an ECS for the aircraft is illustrated in block diagram form.

FIG. 4 illustrates an exemplary aircraft 400 that includes the aircraft cabin 118 and a plurality of gas turbine engines 404. The exemplary aircraft 400 includes four gas turbine engines 404. Other exemplary aircraft 400 could include one, two, or three gas turbine engines 404. Yet other exemplary aircraft 400 could include more than four gas turbine engines 404. Still other exemplary aircraft could include turboprop arrangements, in which a gas turbine engine drives a propeller. Still other exemplary aircraft could include a turbocharged, piston engine. Bleed air from the gas turbine engines 404 (or bleed air from a turbocharger output) is transported through ducts 106 to the ECS 100 in the aircraft 400. The aircraft 400 includes the inlet 174 to the ram air duct 172 of the ECS 100 and an outlet 176 from the ram air duct 172. As discussed above, the ECS 100 conditions the bleed air from the gas turbine engines 404 and provides the conditioned air to the passenger cabin 402 via ducts 116.

Aspects described herein may take the form of an entirely hardware aspect, an entirely software aspect (including firmware, resident software, micro-code, etc.) or an aspect combining software and hardware aspects that may all generally be referred to herein as a "circuit," "module" or "system."

Aspects may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products according to aspects described herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of at least one aspect, a user may access applications (e.g., an ECS abnormal operation detection application) or related data available in the cloud. For example, an ECS abnormal operation detection application could execute on a computing system in the cloud and output a detected abnormal operation indication. In such a case, the ECS abnormal operation detection application could output the detected abnormal operation indication and store the detected abnormal operation indication data at a storage location in the cloud. As another example, the ECS abnormal operation detection application could execute on a computing system in the cloud and output a learned model for a new abnormal operation. Doing so allows a user to access this information from any computing system attached to a network connected to the cloud (e.g., the Internet).

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects, other and further aspects described herein may be devised without departing from the basic scope thereof, and the scope thereof is determined by the claims that follow.

What is claimed is:

1. An aircraft, comprising:
an aircraft cabin adapted to be pressurized;
a gas turbine engine, wherein the gas turbine engine includes at least one engine bleed;
an environmental control system (ECS) operable to receive bleed air from the at least one engine bleed and to provide conditioned air to the aircraft cabin, the ECS including:
a heat exchanger operable to remove heat from an airflow therethrough;
first sensors operable to detect environmental operating conditions of the heat exchanger;
second sensors operable to detect airflow conditions in the heat exchanger;
a controller operable to:
receive environmental operating conditions data for the heat exchanger from the first sensors;
receive measured values from sensors measuring parameters of the heat exchanger from the second sensors;
retrieve from a first data structure an operating model for the heat exchanger based on the received environmental operating conditions, wherein the retrieved operating model includes estimated values for the sensors;
calculate differences between the estimated values and the measured values;
compare the calculated differences to at least one threshold value;
upon the differences exceeding the at least one threshold value:
compare the calculated differences to abnormal operation models in an abnormal operation library data structure; and
upon the calculated differences matching an abnormal operation model in the abnormal operation library data structure, output an abnormal operation identity associated with the matched abnormal operation model.

2. The aircraft of claim 1, wherein the controller is further operable to:
upon the calculated differences not matching an abnormal operation model in the abnormal operation library data structure, store the calculated differences in a new entry in the abnormal operation library data structure;
calculate an abnormal operation model for the new entry; and
store the calculated abnormal operation model in the new entry in the abnormal operation library data structure.

3. The aircraft of claim 2, wherein the controller is further operable to:
determine an abnormal operation identity associated with the calculated differences stored in the new entry; and
associate the determined abnormal operation identity with the new entry.

4. The aircraft of claim 2, wherein the controller calculates the abnormal operation model for the new entry by determining weights of a neural network for a basis function, wherein the basis function is based on at least the received measured values from sensors measuring parameters of the heat exchanger.

5. The aircraft of claim 4, wherein the basis function is further based on the received environmental operating conditions data for a heat exchanger.

6. The aircraft of claim 2, wherein the controller calculates the abnormal operation model for the new entry by determining coefficients for a quadratic equation, wherein at least the received measured values from sensors measuring parameters of the heat exchanger are inputs for the quadratic equation.

7. A computer-implemented method, comprising:
receiving environmental operating conditions data for a heat exchanger;
receiving measured values from sensors measuring parameters of the heat exchanger;
retrieving from a first data structure an operating model for the heat exchanger based on the received environmental operating conditions, wherein the retrieved operating model includes estimated values for the sensors;
calculating differences between the estimated values and the measured values;
comparing the calculated differences to at least one threshold value;
upon the differences exceeding the at least one threshold value:
comparing the calculated differences to abnormal operation models in an abnormal operation library data structure; and
upon the calculated difference matching an abnormal operation model in the abnormal operation library data structure, outputting an abnormal operation identity associated with the matched abnormal operation model.

8. The computer-implemented method of claim 7, further comprising:
upon the calculated differences not matching an abnormal operation model in the abnormal operation library data structure, storing the calculated differences in a new entry in the abnormal operation library data structure;
calculating an abnormal operation model for the new entry; and
storing the calculated abnormal operation model in the new entry in the abnormal operation library data structure.

9. The computer-implemented method of claim 8, further comprising:

determining an abnormal operation identity associated with the calculated differences stored in the new entry; and associating the determined abnormal operation identity with the new entry.

10. The computer-implemented method of claim 8, wherein calculating the abnormal operation model for the new entry comprises determining weights of a neural network for a basis function, wherein the basis function is based on at least the received measured values from sensors measuring parameters of the heat exchanger.

11. The computer-implemented method of claim 10, wherein the basis function is further based on the received environmental operating conditions data for a heat exchanger.

12. The computer-implemented method of claim 8, wherein calculating the abnormal operation model for the new entry comprises determining coefficients for a quadratic equation, wherein at least the received measured values from sensors measuring parameters of the heat exchanger are inputs for the quadratic equation.

13. An environmental control system (ECS) for a vehicle, comprising:
   a heat exchanger operable to remove heat from an airflow therethrough;
   first sensors operable to detect environmental operating conditions of the heat exchanger;
   second sensors operable to detect airflow conditions in the heat exchanger;
   a controller operable to:
      receive environmental operating conditions data for the heat exchanger from the first sensors;
      receive measured values from sensors measuring parameters of the heat exchanger from the second sensors;
      retrieve from a first data structure an operating model for the heat exchanger based on the received environmental operating conditions, wherein the retrieved operating model includes estimated values for the sensors;
      calculate differences between the estimated values and the measured values;
      compare the calculated differences to at least one threshold value;
      upon the differences exceeding the at least one threshold value:
         compare the calculated differences to abnormal operation models in an abnormal operation library data structure; and
         upon the calculated differences matching an abnormal operation model in the abnormal operation library data structure, output an abnormal operation identity associated with the matched abnormal operation model.

14. The ECS of claim 13, wherein the controller is further operable to:
   upon the calculated differences not matching an abnormal operation model in the abnormal operation library data structure, store the calculated differences in a new entry in the abnormal operation library data structure;
   calculate an abnormal operation model for the new entry; and
   store the calculated abnormal operation model in the new entry in the abnormal operation library data structure.

15. The ECS of claim 14, wherein the controller is further operable to:
   determine an abnormal operation identity associated with the calculated differences stored in the new entry; and
   associate the determined abnormal operation identity with the new entry.

16. The ECS of claim 14, wherein the controller calculates the abnormal operation model for the new entry by determining weights of a neural network for a basis function, wherein the basis function is based on at least the received measured values from sensors measuring parameters of the heat exchanger.

17. The ECS of claim 16, wherein the basis function is further based on the received environmental operating conditions data for a heat exchanger.

18. The ECS of claim 14, wherein the controller calculates the abnormal operation model for the new entry by determining coefficients for a quadratic equation, wherein at least the received measured values from sensors measuring parameters of the heat exchanger are inputs for the quadratic equation.

19. The ECS of claim 13, wherein the first sensors comprises at least one of: an altimeter, a pitot-static tube, a temperature sensor, a pressure sensor, and a humidity sensor.

20. The ECS of claim 13, wherein the second sensors comprises at least one of: a temperature sensor in the heat exchanger, an air flow sensor in the heat exchanger, and a humidity sensor in the heat exchanger.

* * * * *